(No Model.) 2 Sheets—Sheet 1.
O. P. BRIGGS.
MACHINE FOR REELING CABLE.
No. 551,255. Patented Dec. 10, 1895.
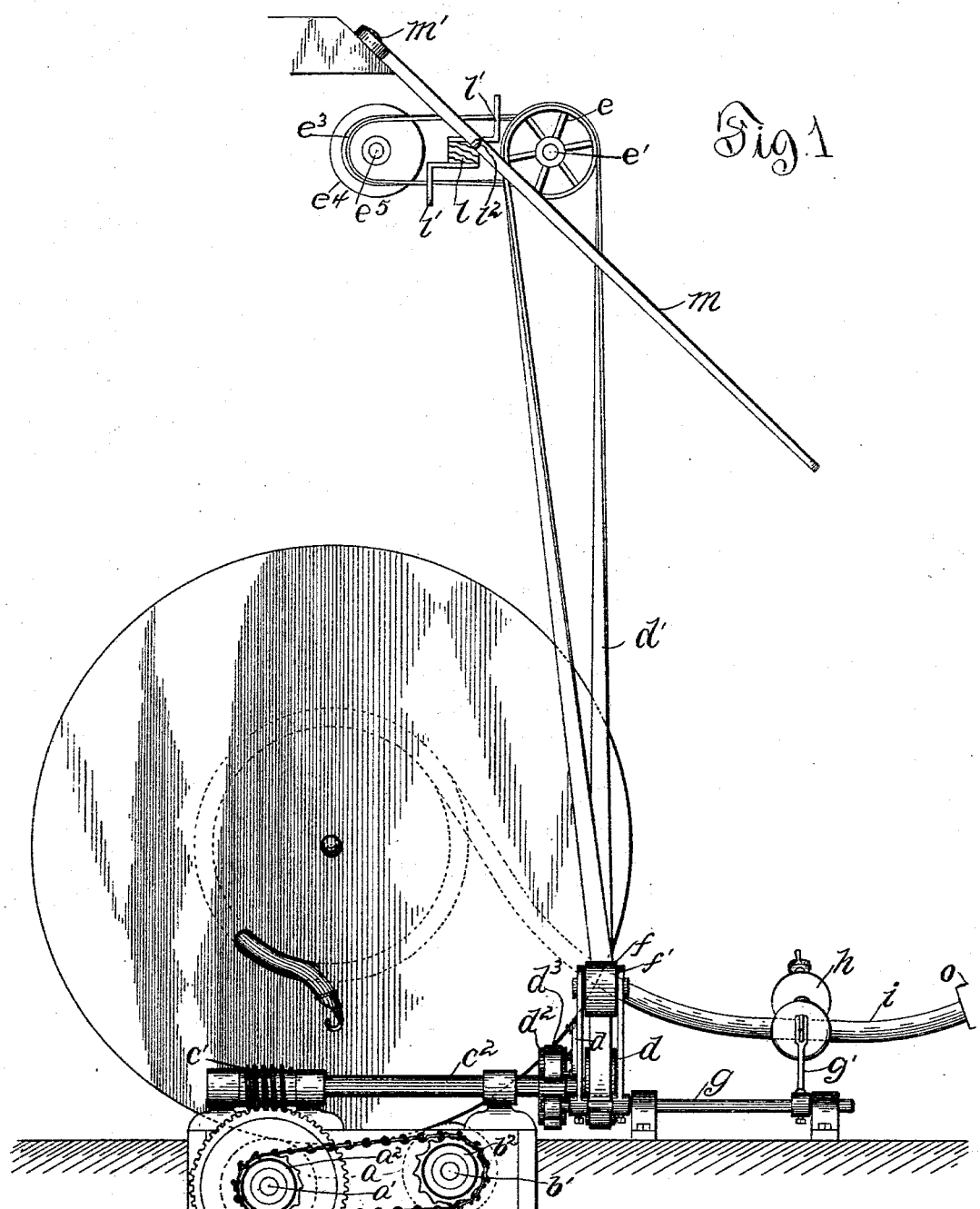
Witnesses:
George L. Cragg.
W. Clyde Jones.
Inventor:
Orlando P. Briggs
By Barton & Brown
Attorneys.

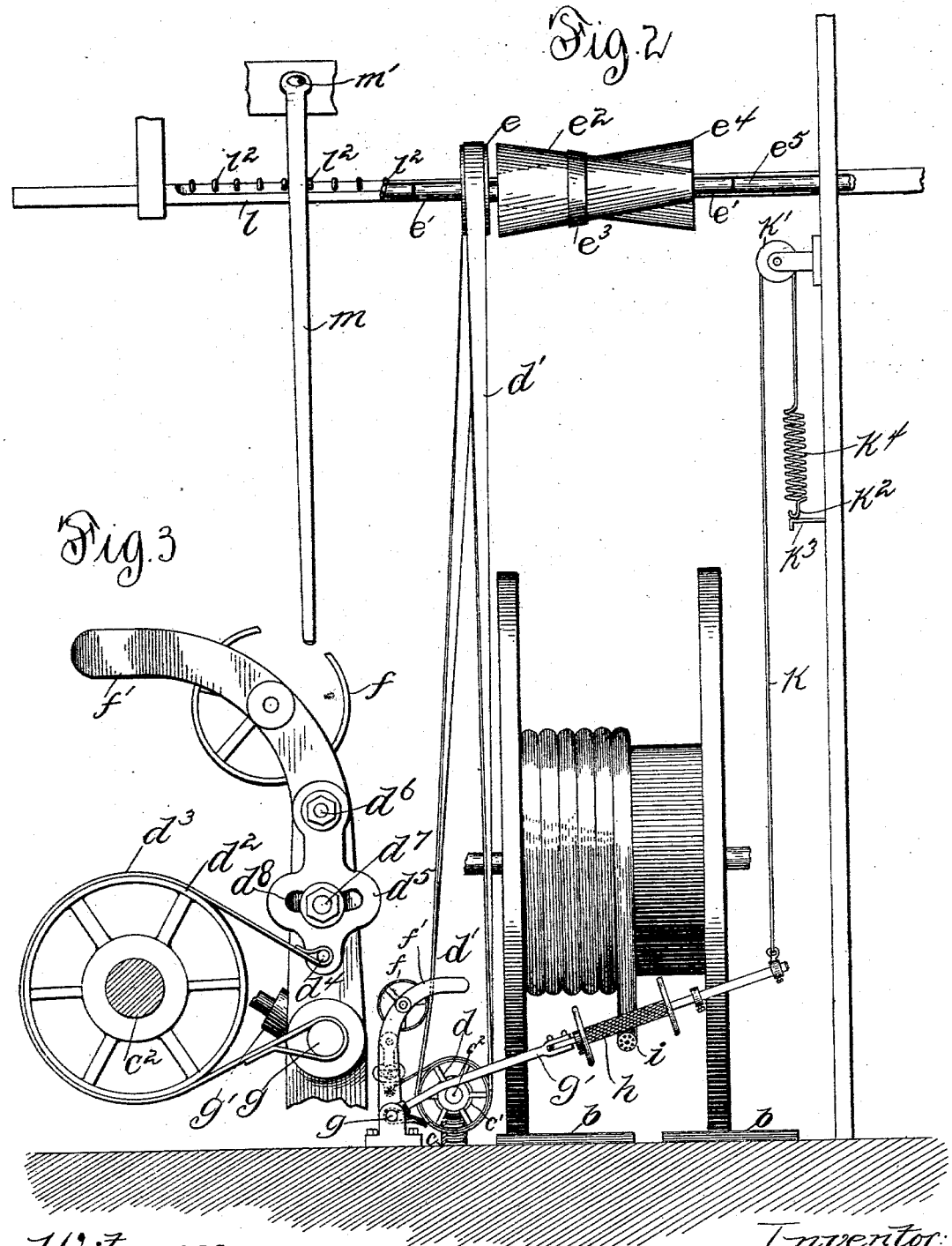

UNITED STATES PATENT OFFICE.

ORLANDO P. BRIGGS, OF CHICAGO, ILLINOIS, ASSIGNOR TO THE WESTERN ELECTRIC COMPANY, OF SAME PLACE.

MACHINE FOR REELING CABLE.

SPECIFICATION forming part of Letters Patent No. 551,255, dated December 10, 1895.

Application filed May 7, 1894. Serial No. 510,345. (No model.)

*To all whom it may concern:*

Be it known that I, ORLANDO P. BRIGGS, a citizen of the United States, residing at Chicago, in the county of Cook and State of Illinois, have invented a certain new and useful Improvement in Machines for Reeling Cable, (Case No. 10,) of which the following is a full, clear, concise, and exact description, reference being had to the accompanying drawings, forming a part of this specification.

My invention relates to a machine for reeling cable, and its object is the provision of means for automatically winding cable upon a reel as the same is fed forward.

My invention in its preferred form comprises a set of drums upon which the reel rests, and which are adapted to be rotated to rotate the reel and wind the cable thereon, the reel being rotated from time to time as slack accumulates between the reel and the machine which feeds forward the cable, the rotating mechanism being thrown into operation by means of a roller which rests upon the cable and is mounted upon the end of an arm keyed to a rotatable shaft, the roller descending as the slack accumulates to rotate the shaft in one direction, and ascending to rotate the shaft in the opposite direction as the slack in the cable is being taken up by the rotation of the reel. Upon an arm keyed to the shaft is a loose pulley which is adapted to bear against a belt running loosely over a driving-pulley geared to the rotating mechanism, the loose pulley being caused to bear against the belt with sufficient force to cause the belt to rotate the driving-pulley when slack has accumulated in the required degree, the reel being thus rotated to wind the cable thereon until the roller is raised to such a height that the loose pulley permits the belt to slide over the driving-pulley without turning the same. A brake is also provided which is thrown into operation as the belt is loosened, and thrown out of operation when the belt is tightened, the brake being actuated by the arm that carries the loose pulley. The reel is thus rotated intermittently to wind upon the same the cable that has been fed forward during the intervals.

My invention will be more readily understood by reference to the accompanying drawings, in which—

Figure 1 is an elevational side view of a machine embodying my invention. Fig. 2 is a front view thereof. Fig. 3 is a detached view of the belt-tightener and brake.

Like letters refer to like parts in the several figures.

The reel upon which the cable is to be wound rests upon the drums $a\,b\,b$, the drums $a$ being mounted upon the shaft $a'$ and the drums $b\,b$ upon the shaft $b'$. The surfaces of the drums are toothed or corrugated, so that they will grasp the periphery of the reel to rotate the same. Upon the shafts $a'$ and $b'$ are keyed the sprocket-wheels $a^2 b^2$, the wheel $b^2$ being driven from the wheel $a^2$ by means of the chain $a^3$. Upon the shaft $a'$ is keyed the worm-wheel $c$ which meshes with the worm $c'$ mounted upon the shaft $c^2$. A pulley $d$ is keyed to the shaft $c^2$, and a belt $d'$ passes over the same and over a pulley $e$ carried upon the counter-shaft. The belt $d'$ passes loosely over pulley $f$ carried upon the arm $f'$ which pulley is adapted to be brought against the belt to cause the same to grasp said pulley $d$ to rotate the same. The arm $f'$ is mounted upon the rotatable shaft $g$ to which is keyed the arm $g'$. Said arm $g'$ carries upon its end the roller $h$, which, during the operation of the machine, rests upon the cable $i$ which is being reeled. When the machine is not in use, the arm $g'$ may be maintained in position by means of the cord $k$ which passes over the pulley $k'$ and is provided upon its end with a hook $k^2$ which may be hooked over the pin $k^3$, a coiled spring $k^4$ being provided upon the end of the cord to afford resiliency.

Upon the shaft $c^2$ is keyed a second pulley $d^2$, about which extends the strap $d^3$, one end of which encircles the rotatable shaft $g$, while the other end is secured to a pin $d^4$, carried upon the arm $f'$, so that as arm $f'$ is moved from pulley $d^2$ the strap is caused to grasp the face of said pulley to brake the same and to release the same when the arm is rotated back again. The pin $d^4$ is carried upon the end of an arm $d^5$, pivoted at $d^6$, so that the arm may be moved back or forth to adjust the strap, a bolt $d^7$ working in a curved slot $d^8$ provided for securing the arm in its adjusted position.

Upon the counter-shaft $e'$ is mounted a cone-pulley $e^2$, which is belted by means of a belt $e^3$ with a reversed cone-pulley $e^4$, carried on shaft $e^5$. To vary the speed the belt $e^3$ may be moved along the cone-pulleys, a longitudinally-movable bar $l$ being for this purpose provided with fingers $l'$ $l'$, which extend on each side of the belt $e^3$, so that as the bar is moved longitudinally said belt is moved along the cone-pulleys.

Upon the bar $l$ are provided a number of short pins $l^2$ $l^3$, which are adapted to be engaged by the lever $m$, pivoted loosely at $m'$, so that it may be raised over the tops of the pins. When it is desired to move the bar $l$ longitudinally to vary the speed the lever $m$ is moved to one side and brought into engagement with one of the pins and then moved back, carrying with it the bar $l$, the operation being repeated until the belt $e^3$ has been brought to the proper position.

As the cable is fed forward from the outlet $o$ of the machine—in this instance a machine for forming a lead covering about the cable—slack accumulates between said outlet and the reel, and the roller $h$, resting upon the cable, descends, thus rotating the arm $g'$ and causing the loose pulley $f$ to press against the belt $d'$ with increasing force, the strap $d^3$ being caused during the same time to gradually release the pulley $d^2$. When slack has thus accumulated to the required degree, the loose pulley $f$ is pressed against belt $d'$ with sufficient force to cause the rotation of pulley $d$, the strap $d^3$ being loosened to throw the brake out of action. The rotation of pulley $d$ causes the rotation of the drums $a$ $b$, which, engaging the periphery of the reel, cause the rotation of the latter and the winding thereon of the cable. As the reel winds up the accumulated slack, the roller is raised gradually releasing the belt and tightening the brake-strap until the rotating mechanism is brought to rest. The slack then again accumulates and continues to do so until the tightening of the belt and the loosening of the brake again cause the operation of the rotating mechanism and the winding up of the slack the winding of the cable being thus continued intermittently.

It is evident that my invention is susceptible of many modifications, and that it may be used in the reeling of other than cable—as, for instance, lead pipe—and I do not, therefore, desire to limit myself to the exact mechanism shown and described; but, Having described my invention, what I claim as new, and desire to secure by Letters Patent, is—

1. The combination with a reel upon which the cable is adapted to be wound, of a roller adapted to rest upon the portion of the cable passing to the reel and adapted to descend as the slack accumulates and to rise as the slack is taken up, reel rotating mechanism, and means controlled by said roller for throwing said reel-rotating mechanism into operation as the roller descends, and for throwing the same out of operation as the roller ascends; substantially as described.

2. The combination with a reel upon which the cable is adapted to be wound, of a roller adapted to rest upon the portion of the cable passing to the reel and adapted to descend as slack accumulates and to rise as the slack is taken up, rotating mechanism for driving said reel, a continuously driven loose belt passing over the driving pulley of said rotating mechanism, a belt tightening pulley adapted to be brought against said belt to throw said rotating mechanism into operation, means for moving said belt tightening pulley against said belt by the descent of said roller and for moving the same out of engagement with the belt by the ascent of said roller, and a brake adapted to be thrown into operation by the ascent of said roller to bring the reel to rest, substantially as described.

3. The combination with a reel upon which the cable is adapted to be wound, of a roller adapted to rest upon the portion of the cable passing to the reel and adapted to descend as slack accumulates and to rise as the slack is taken up, reel-rotating mechanism, a continuous driven belt normally slipping loosely over the driving pulley of said rotating mechanism, and a belt tightener actuated by said roller and adapted to tighten the belt as the roller descends and to permit the same to run loosely as the roller ascends; substantially as described.

4. The combination with a reel, of rotating mechanism for rotating the same, a continuously driven belt passing loosely over the driving pulley of said rotating mechanism, a rotatable shaft, an arm mounted thereon carrying a loose pulley adapted to be pressed against said belt to tighten the same, and a second arm mounted upon said shaft and resting upon the cable between said reel and the mechanism feeding the cable forward; whereby as slack accumulates said second arm descends to throw said rotating mechanism into operation, substantially as described.

5. The combination with the reel, of the drums upon which the reel is adapted to rest, the driving pulley adapted to drive said drums, the belt slipping loosely over said pulley, the rotatable shaft carrying the arm supporting the belt tightening pulley, and the arm adapted to rest upon the cable, and the brake comprising the pulley surrounded by a strap, one end thereof being stationary and the other mounted upon said belt tightener arm, substantially as described.

6. The combination with the drums $a$ $b$ upon which the reel is adapted to rest, of the worm wheel $c$ and worm $c'$, the sprocket wheels $a^3$ $b^2$ and chain $a^3$, the pulley $d$, belt $d'$ normally slipping loosely over the same, the rotatable shaft $g$, the arm $f'$ carrying the loose pulley $f$, the arm $g'$ carrying roller $h$, said roller resting upon the cable, the pulley $d^2$ and the strap $d^3$ encircling said pulley and attached by the movable end to said arm $f'$, substantially as described.

7. The combination with a belt adapted to be shifted, of a longitudinally movable bar carrying fingers adapted to engage the belt, pins provided upon said bar, and a lever pivoted at one end and adapted when rocked on its pivot to engage the pins provided upon said bar, the lever being pivoted to permit movement of the same over the ends of the pins, whereby the bar may be moved by the engagement of the lever with the pins, and a movement greater than the stroke of the lever imparted to the bar; substantially as described.

In witness whereof I hereunto subscribe my name this 9th day of April, A. D. 1894.

ORLANDO P. BRIGGS.

Witnesses:
W. CLYDE JONES,
GEORGE L. CRAGG.